United States Patent [19]
Sethuraman

[11] Patent Number: 6,167,088
[45] Date of Patent: Dec. 26, 2000

[54] METHOD AND APPARATUS FOR PERFORMING ADAPTIVE ENCODING RATE CONTROL OF A VIDEO INFORMATION STREAM INCLUDING 3:2 PULL-DOWN VIDEO INFORMATION

[75] Inventor: Sriram Sethuraman, Highstown, N.J.

[73] Assignee: Sarnoff Corporation, Princeton, N.J.

[21] Appl. No.: 09/151,425

[22] Filed: Sep. 11, 1998

Related U.S. Application Data

[60] Provisional application No. 06/080,536, Apr. 3, 1998.

[51] Int. Cl.[7] .................................................. H04N 7/12
[52] U.S. Cl. ............................................................ 375/240.1
[58] Field of Search ............................ 375/240; 348/384, 348/390, 400, 401, 402, 405, 409, 415, 416, 419; 382/232, 236, 238, 251

[56] References Cited

U.S. PATENT DOCUMENTS

| | | | |
|---|---|---|---|
| 5,144,424 | 9/1992 | Savatier | 358/133 |
| 5,606,373 | 2/1997 | Dopp et al. | 348/459 |
| 5,675,379 | 10/1997 | Kato et al. | 348/97 |
| 5,757,421 | 5/1998 | Kato et al. | 348/97 |

FOREIGN PATENT DOCUMENTS

| | | |
|---|---|---|
| 0 588 669 | 3/1994 | European Pat. Off. . |
| 0 755 156 | 1/1997 | European Pat. Off. . |

*Primary Examiner*—Chris S. Kelley
*Assistant Examiner*—Allen Wong
*Attorney, Agent, or Firm*—William J. Burke

[57] ABSTRACT

A method and apparatus for adapting and enhancing the behavior of an MPEG-like encoder to the presence and/or absence of 3:2 pull-down processed video information within a video information stream to be encoded. Specifically, a rate controller within an MPEG-like encoder, in response to a detection of 3:2 pull-down processing of material to be encoded, such as mixed mode video material, dynamically allocates a group of pictures (GOP) bit budget.

20 Claims, 6 Drawing Sheets

METHOD AND APPARATUS FOR PERFORMING ADAPTIVE ENCODING RATE CONTROL OF A VIDEO INFORMATION STREAM INCLUDING 3:2 PULL-DOWN VIDEO INFORMATION

This application claims the benefit of U.S. Provisional Application No. 60/080,536, filed Apr. 3, 1998.

The invention relates to information compression systems generally and, more particularly, the invention relates to a method and apparatus for adapting a video information encoding system to the presence and/or absence of video information processed according to a 3:2 pull-down technique.

BACKGROUND OF THE DISCLOSURE

In several communications systems the data to be transmitted is compressed so that the available bandwidth is used more efficiently. For example, the Moving Pictures Experts Group (MPEG) has promulgated several standards relating to digital data delivery systems. The first, known as MPEG-1 refers to ISO/IEC standards 11172 and is incorporated herein by reference. The second, known as MPEG-2, refers to ISO/IEC standards 13818 and is incorporated herein by reference. A compressed digital video system is described in the Advanced Television Systems Committee (ATSC) digital television standard document A/53, and is incorporated herein by reference.

The above-referenced standards describe data processing and manipulation techniques that are well suited to the compression and delivery of video, audio and other information using fixed or variable length digital communications systems. In particular, the above-referenced standards, and other "MPEG-like" standards and techniques, compress, illustratively, video information using intra-frame coding techniques (such as run-length coding, Huffman coding and the like) and inter-frame coding techniques (such as forward and backward predictive coding, motion compensation and the like). Specifically, in the case of video processing systems, MPEG and MPEG-like video processing systems are characterized by prediction-based compression encoding of video frames with or without intra- and/or inter-frame motion compensation encoding.

It is often necessary to convert 24 progressive frames per second (fps) video material, such as film, to a 30 interlaced frames per second (60 fields per second) video format, such as the NTSC format. This conversion is accomplished using the well-known 3:2 pull-down technique, where the top and bottom fields of the progressive film materials are alternately repeated for alternate frames to obtain 10 fields from 4 progressive frames (i.e., 60 fields from 24 frames). The sequence of fields produced using the 3:2 pull-down technique is as follows (where T stands for top and B stands for bottom field): T0, B0, T9, B1, T1, B2, T2, B2, T3, B3, T4, B4, T4 . . . .

In an MPEG-like encoder it is desirable to determine if the video material being encoded has been processed using the 3:2 pull-down technique, since the repeated fields can then be removed so that only the original 24 fps material is encoded (as progressive frames). The pull-down information can be passed on to the decoder using MPEG-2 compliant flags. In the absence of such detection, the repeated fields are coded again resulting in up to 20% loss in the performance or compression. Unfortunately, present 3:2 pull-down detectors require an inordinate amount of processing and memory resources. Moreover, due to, e.g., transcoding errors generated during the 3:2 pull-down processing of a video signal, present 3:2 pull-down detectors frequently produce "false detections," which negatively impact subsequent encoding of the video signal.

MPEG-2 encoders utilizing the TM-5 recommended rate control algorithm typically do not properly encode a "mixed mode" video signal, i.e., a video signal including material processed by the 3:2 pull-down technique and original 30fps or 60fps material. In such a case (even with flawless 3:2 pull-down detection), the MPEG-2 encoder will, at best, inefficiently encode the 3:2 pull-down processed material.

Therefore, it is seen to be desirable to address the above-described problems by providing a method and concomitant apparatus for adapting and enhancing the behavior of an MPEG-like encoder to the presence and/or absence of 3:2 pull-down processed video information within a video information stream to be encoded. Moreover, it is seen to be desirable to provide a robust and computationally efficient method and concomitant apparatus to determine if a video information stream to be encoded has been subjected to 3:2 pull-down processing.

SUMMARY OF THE INVENTION

The invention comprises a method and apparatus for adapting and enhancing the behavior of an MPEG-like encoder to the presence and/or absence of 3:2 pull-down processed video information within a video information stream to be encoded. Specifically, a rate controller within an MPEG-like encoder, in response to a detection of 3:2 pull-down processing of material to be encoded, such as mixed mode video material, dynamically allocates a group of pictures (GOP) bit budget.

Specifically, in a system for sequentially encoding image frames according to a group of pictures (GOP) information structure to produce a sequence of compressed images, a method according to the invention for processing an image frame comprises the steps of: determining if a frame rate of one or more images of said sequence of images, including said image frame being processed, has been increased according to a frame rate modification process; adapting, in response to said determination, a GOP bit allocation parameter, said bit allocation parameter being indicative of a number of bits remaining in a bit allocation for a current GOP; and encoding, using said GOP bit allocation parameter and in accordance with said GOP information structure, said image frame being processed.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
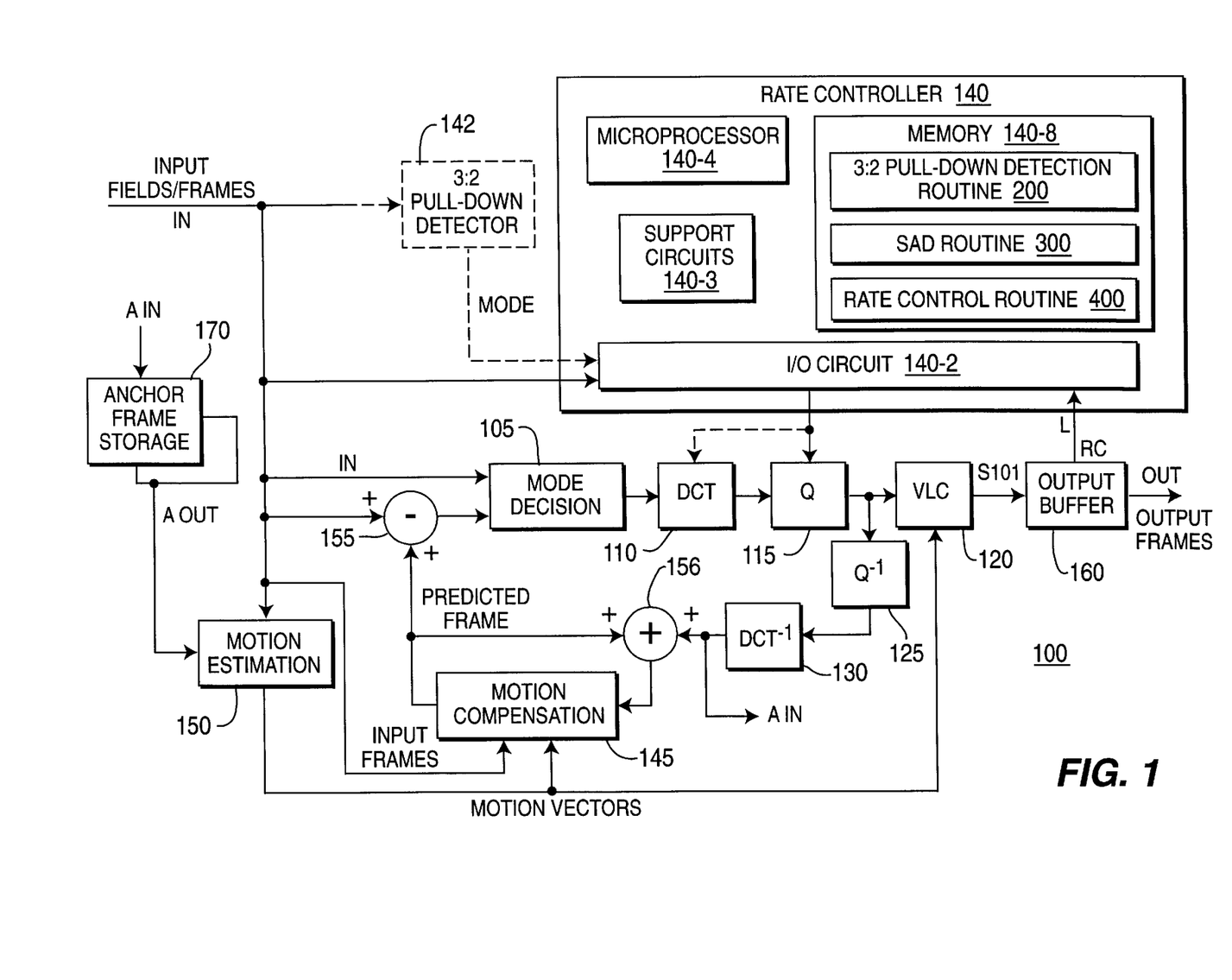
FIG. 1 depicts an MPEG-like encoding system 100 including apparatus according to the invention.

FIG. 1 depicts an MPEG-like encoding system 100 according to the invention. The MPEG-like encoding system 100 receives and encodes an input information stream IN comprising a plurality of uncompressed information frames, illustratively a sequence of images forming a video information stream, to produce an encoded output information stream OUT that nominally conforms to group of pictures (GOP) data structure. Each GOP data structure comprises a plurality of sub-GOPs comprising a respective anchor frame (e.g., an I-frame or a P-frame) and one or more non-anchor frames (e.g., a B-frame).

The MPEG-like encoding system 100 comprises an adder 155, a mode decision module 105, a discrete cosine transform (DCT) module 110, a quantizer (Q) module 115, a variable length coding (VLC) module 120, an inverse quantizer ($Q^{-1}$) 125, an inverse discrete cosine transform ($DCT^{-1}$) module 130, a subtractor 156, an output buffer 160, a rate control module 140, an optional 3:2 pull-down detector 142, a motion compensation module 145, a motion estimation module 150 and an anchor frame storage module 170. Although the MPEG-like encoding system 100 comprises a plurality of modules, those skilled in the art will realize that the functions performed by the various modules are not required to be isolated into separate modules as shown in FIG. 1. For example, the set of modules comprising the motion compensation module 145, inverse quantization module 125 and inverse DCT module 130 is generally known as an "embedded decoder."

In the case of the input information stream IN comprising a video information stream, the video information stream represents a sequence of images on the input signal path IN which is digitized and represented as, illustratively a luminance signal Y and two color difference signals $C_r$ and $C_b$ in accordance with the MPEG standards. These signals are further divided into a plurality of layers (sequence, group of pictures, picture, slice, macroblock and block) such that each picture (frame) is represented by a plurality of macroblocks. Each macroblock comprises four (4) luminance blocks, one $C_r$ block and one $C_b$ block where a block is defined as an eight (8) by eight (8) sample array. The division of a picture into block units improves the ability to discern changes between two successive pictures and improves image compression through the elimination of low amplitude transformed coefficients (discussed below). The digitized signal may optionally undergo preprocessing such as format conversion for selecting an appropriate window, resolution and input format.

Subtractor 155 generates a residual signal (also referred to in the art as simply the residual or the residual macroblock) by subtracting a predicted macroblock on the signal path PF from an input macroblock on the signal path IN.

The mode decision module 105 receives the residual macroblock (i.e., the predicted macroblock) from the subtractor 155 and the input macroblock from the signal path IN. If the predicted macroblock is substantially similar to the input macroblock (i.e., the residuals are relatively small and are easily coded using very few bits), then the mode decision module 105 selects the residual signal from the subtractor 155 for inter-coding. That is, the macroblock will be encoded as a motion compensated macroblock, i.e., motion vector(s) and associated residual(s). However, if the difference between the predicted macroblock and the input macroblock is substantial, the residuals are difficult to code. Consequently, the system operates more efficiently by directly coding the input macroblock rather than coding the motion compensated residual macroblock.

The above selection process is known as a selection of the coding mode. Coding the input macroblock is referred to as intra-coding, while coding the residuals is referred to as inter-coding. The selection between these two modes is known as the Intra-Inter-Decision (IID). The IID is typically computed by first computing the variance of the residual macroblock (Var R) and the variance of the input macroblock (Var I). The coding decision is based on these values. There are several functions that can be used to make this decision. For example, using the simplest function, if Var R is less than Var I, the IID selects the Inter-mode. Conversely, if Var I is less than Var R, the IID selects the Intra-mode.

Figure 2:
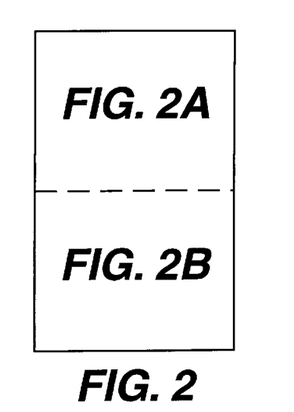
FIGS. 2A and 2B together depict a rate control routine according to the invention and suitable for use in the MPEG-like encoding system of FIG. 1.

Optionally, the mode decision module 105 provides an output signal MD indicative of the presence or absence of an information stream discontinuity. The operation of the controller will be described in more detail below with respect to FIGS. 2 and 3.

The selected block (i.e., input macroblock or residual macroblock) is then coupled to the discrete cosine transform process to each block of the received macroblock to produce a set of, illustratively, eight (8) by eight (8) blocks of DCT coefficients. The DCT basis function or subband decomposition permits effective use of psycho visual criteria which is important for the next step of quantization. It should be noted that while the DCT module may be adapted to process any size block or macroblock, though the eight by eight block size is commonly used in MPEG-like compression systems. The DCT coefficients produced by the DCT module 110 are coupled to the quantizer module 115.

The quantizer module 115 quantizes the received DCT coefficients to produce a quantized output block. The process of quantization reduces the accuracy with which the DCT coefficients are represented by dividing the DCT coefficients by a set of quantization values with appropriate rounding to form integer values. The quantization values can be set individually for each DCT coefficient, using criteria based on the visibility of the basis functions (known as visually weighted quantization). Namely, the quantization value corresponds to the threshold for visibility of a given basis function, i.e., the coefficient amplitude that is just detectable by the human eye. By quantizing the DCT coefficients with this value, many of the DCT coefficients are converted to the value "zero", thereby improving image compression efficiency. The process of quantization is a key operation and is an important tool to achieve visual quality and to control the encoder to match its output to a given bit rate (rate control). Since a different quantization value can be applied to each DCT coefficient, a "quantization matrix" is generally established as a reference table, e.g., a luminance quantization table or a chrominance quantization table. Thus, the encoder chooses a quantization matrix that determines how each frequency coefficient in the transformed block is quantized.

The primary task of the rate control module 140 is to manage the fullness or utilization level of the output buffer 160, from which a constant output bit rate is provided to a transmission channel. The constant bit rate must be maintained even though the encoding rate may vary significantly, depending on the content of each image and the sequence of images. The output buffer 160 produces a rate control signal RC indicative of a utilization level of the output buffer 160.

The rate control module 140 utilizes the rate control signal RC to adapt various parameters of the encoding process, such as the quantization scale (step size) used to quantize the DCT coefficients and/or the number of DCT coefficients that are coded by the system. In this manner, the rate control module 140 controls the bit rate of the output information stream produced by the VLC 120, thereby maintaining an appropriate utilization level of the output buffer 160.

The rate control module 140 adjusts the output bit rate of VLC 120 by, e.g., selecting a quantizer scale for each frame in a manner maintaining the overall quality of the video image while controlling the coding rate. Namely, a quantizer scale is selected for each frame such that target bit rate for the picture is achieved while maintaining a uniform visual quality over the entire sequence of pictures. In this manner, the rate control module 140 operates to prevent buffer overflow and underflow conditions on the decoder side (e.g., within a receiver or target storage device, not shown) after transmission of the output information stream OUT.

Another important task of the rate control module 140 is to insure that the bit stream produced by the encoder does not overflow or underflow an input buffer in a decoder (e.g., within a receiver or target storage device, not shown) receiving a transmission comprising the output information stream OUT. Overflow and underflow control is accomplished by maintaining and monitoring a virtual buffer within the encoder. The virtual buffer is known as the video buffering verifier (VBV). To ensure proper decoder input buffer bit control, the encoder's rate control process establishes for each picture, and also for each macroblock of pixels comprising each picture, a bit quota (also referred to herein as a bit budget). By coding the blocks and the overall picture using respective numbers of bits that are within the respective bit budgets, the VBV does not overflow or underflow. Since the VBV mirrors the operation of the decoder's input buffer, if the VBV does not underflow or overflow, then the decoder's input buffer will not underflow or overflow.

To accomplish such buffer control, the rate controller makes the standard assumption in video coding that the current picture looks somewhat similar to the previous picture. If this assumption is true, the blocks of pixels in the picture are motion compensated by the coding technique and, once compensated, require very few bits to encode. This method works fairly well, as long as the actual number of bits needed to code the picture is near the target number of bits assigned to the picture, i.e., t hat the number of bits actually used is within the bit quota for that picture.

The quantized DCT coefficients (e.g., an 8×8 block of quantized DCT coefficients) produced by the quantizing module 115 are coupled to the variable length coding (VLC) module, where the two-dimensional block of quantized coefficients is scanned in a "zigzag" order to convert it into a one-dimensional string of quantized DCT coefficients. This zigzag scanning order is an approximate sequential ordering of the DCT coefficients from the lowest spatial frequency to the highest. Variable length coding (VLC) module 120 then encodes the string of quantized DCT coefficients and all side-information for the macroblock using variable length coding and run-length coding.

To perform motion prediction and compensation, the first encoding module 101 regenerates encoded anchor frames for use as reference frames. Specifically, the quantized DCT coefficients (e.g., an 8×8 block of quantized DCT coefficients) produced by the quantizing module 115 are coupled to the inverse quantizing ($Q^{-1}$) module 125, where an inverse quantizing process is performed on each macroblock. The resulting dequantized DCT coefficients (e.g., an 8×8 block of dequantized DCT coefficients) are passed to the inverse DCT ($DCT^{-1}$) module 130, where an inverse DCT process is performed on each macroblock to produce a decoded error signal. The error signal produced by the $DCT^{-1}$ module 130 is coupled to an input of adder 156.

Motion estimation module 150 receives the input information stream IN and a stored anchor frame information stream AOUT. The stored anchor frame information stream AOUT is provided by the anchor frame storage module 170, which stores an input anchor frame information stream AIN that is provided by the second encoding module 101, and will be discussed in more detail below. Briefly, the stored anchor frame information stream AOUT represents a decoded version of the intra-coded first anchor frame of a GOF or GOP presently being encoded by the second encoding module 102 (and first encoding module 101).

The motion estimation module 150 estimates motion vectors using the input information stream IN and the stored anchor frame information stream AOUT. A motion vector is a two-dimensional vector which is used by motion compensation to provide an offset from the coordinate position of a block in the current picture to the coordinates in a reference frame. The reference frames can be forward predicted coded frames (P-frames) or bidirectional (i.e., forward can backward) predicted frames (B-frames). The use of motion vectors greatly enhances image compression by reducing the amount of information that is transmitted on a channel because only the changes between the current and reference frames are coded and transmitted. The motion vectors are coupled to the motion compensation module 145 and the VLC module 120.

The motion compensation module 145 utilizes the received motion vectors to improve the efficiency of the prediction of sample values. Motion compensation involves a prediction that uses motion vectors to provide offsets into the past and/or future reference frames containing previously decoded sample values that are used to form the prediction error. Namely, the motion compensation module 150 uses the previously decoded frame and the motion vectors to construct an estimate of the current frame. Furthermore, those skilled in the art will realize that the functions performed by the motion estimation module and the motion compensation module can be implemented in a combined module, e.g., a single block motion compensator.

Prior to performing motion compensation prediction for a given macroblock, a coding mode must be selected. IN the area of coding mode decision, the MPEG and MPEG-like standards provide a plurality of different macroblock coding modes. Specifically, MPEG-2 provides macroblock coding modes which include intra mode, no motion compensation mode (No MC), forward/backward/average inter mode and field/frame DCT mode.

Once a coding mode is selected, motion compensation module 145 generates a motion compensated prediction frame (e.g., a predicted image) on path PF of the contents of the block based on past and/or future reference pictures. This motion compensated prediction frame on path PF is subtracted, via subtractor 155, from the input information frame IN (e.g., a video image) in the current macroblock to form an error signal or predictive residual signal. the formation of the predictive residual signal effectively removes redundant information in the input video image. As previously discussed, the predictive residual signal is coupled to the mode decision module 105 for further processing.

The VLC data stream produced by the VLC encoder 120 is received into the buffer 135, illustratively a "First In-First Out" (FIFO) buffer capable of holding at least one encoded sub-GOP according to the GOP data structure. The VLC data stream stored in buffer 135 is selectively coupled, via selector 104, to the output buffer 160, illustratively a FIFO buffer.

A consequence of using different picture types and variable length coding is that the overall bit rate into the output buffer 160 is variable. Namely, the number of bits used to code each frame can be different. In applications that involve a fixed-rate channel for coupling the output information stream OUT to, e.g., a storage medium or telecommunication channel, the output buffer 160 is used to match the encoder output to the channel for smoothing the bit rate. Thus, the output signal OUT of FIFO buffer 160 is a compressed representation of the input information stream IN.

Optional 3:2 pull-down detector 142 receives the input video information stream IN and produces an output control signal MODE indicative of the presence (e.g., native 24fps) or absence (e.g., native 30fps) of 3:2 pull-down processed video information within the input video information stream IN. The 3:2 pull-down detector 142 utilizes a "field differencing" method in which consecutive fields within the input video information stream IN are compared to determine if the fields are repeated in a manner indicative of 3:2 pull-down processing of the underlying video information. An exemplary field differencing based 3:2 pull-down detection routine is described below with respect to FIG. 4. To reduce the amount of computation required to perform a field to field comparison, a partial comparison is performed by utilizing a sum of absolute differences (SAD) method. An exemplary field differencing routine is described below with respect to FIG. 5.

The rate control module 140 depicted in FIG. 1 comprises a microprocessor 140-4 as well as memory 140-8 for storing a simultaneous encoding, adaptive frame switching routine 200 and/or an "on demand" encoding, adaptive frame switching routine 400. The microprocessor 140-4 cooperates with conventional support circuitry 140-6 such as power supplies, clock circuits, cache memory and the like as well as circuits that assist in executing the software routines. As such, it is contemplated that some of the process steps discussed herein as software processes may be implemented within hardware, e.g., as circuitry that cooperates with the microprocessor 140-4 to perform various steps. The controller 140 also contains input/output circuitry 140-2 that forms an interface between the various encoding modules (101 and 102) and the selector (104). Although the controller 140 is depicted as a general purpose computer that is programmed to perform various control functions in accordance with the present invention, the invention can also be implemented in hardware as an application specific integrated circuit (ASIC). As such, any process or method steps described herein (e.g., with respect to FIGS. 2A and 2B) are intended to be broadly interpreted as being equivalently performed by software, hardware, or a combination thereof.

In one embodiment of the invention, the rate control module 14 is responsive to the output control signal MODE, which is produced by the 3:2 pull-down detector 142 and is indicative of the presence (e.g., native 24 fps) or absence (e.g., native 30 fps) of 3:2 pull-down processed video information within the input video information stream IN.

In another embodiment of the invention 3:2 pull-down detector 142 is not included within the encoder 100 of FIG. 1; rather, the 3:2 pull-down detection function in incorporated within the rate control module 140 as, illustratively, 3:2 pull-down detection routine 400.

Figure 2A:
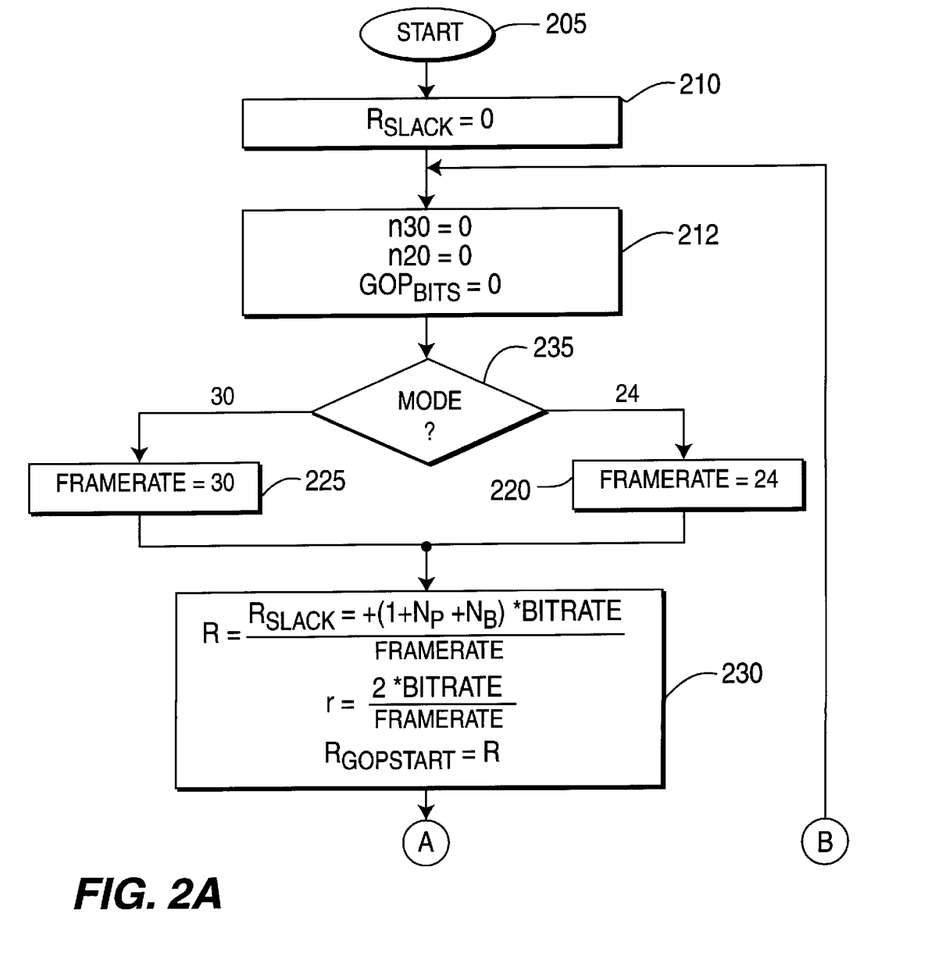
Figure 2B:
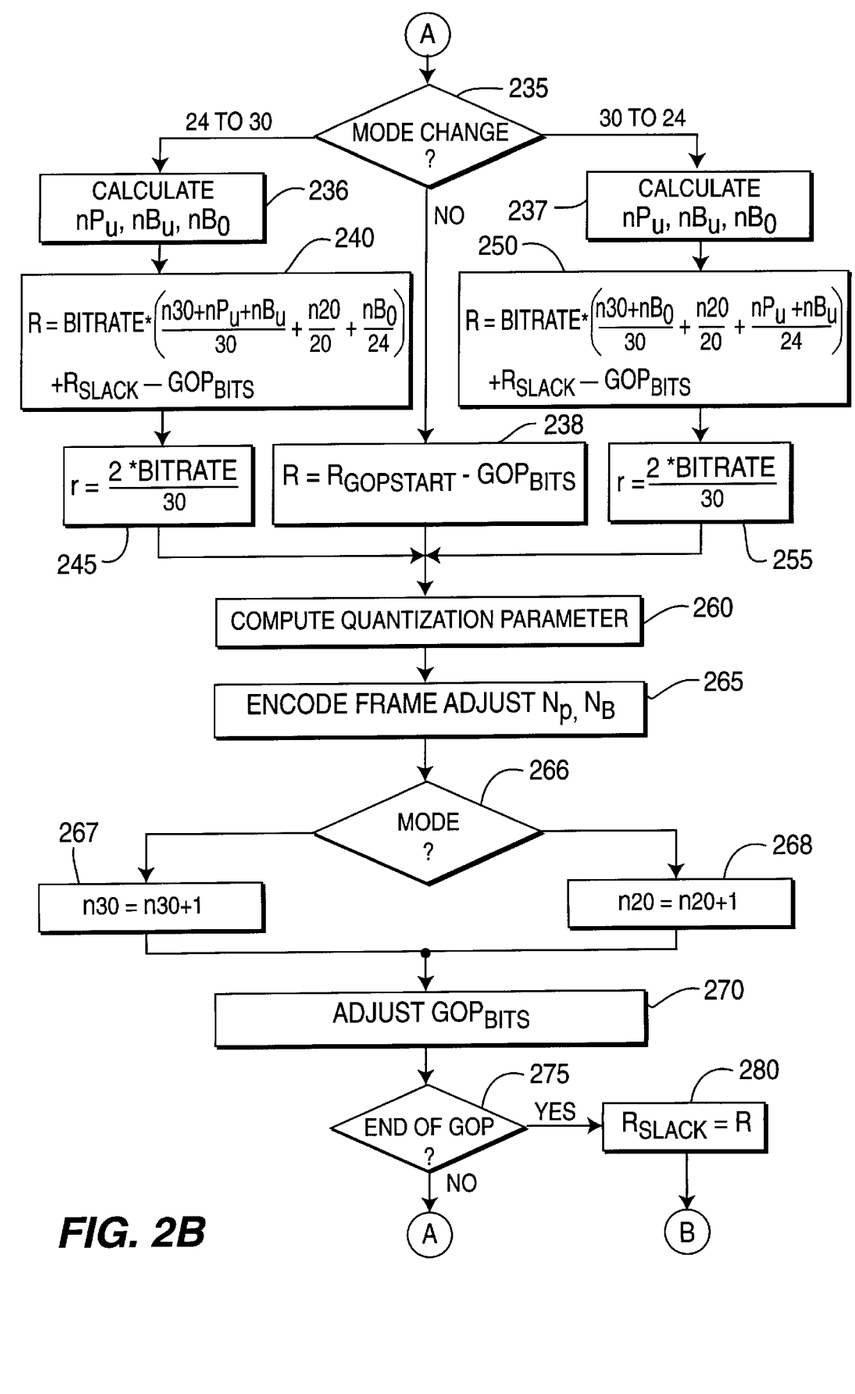

FIGS. 2A and 2B depicts an adaptive rate control routine 200 according to the invention and suitable for use in the MPEG-like encoding system 100 of FIG. 1. FIG. 2A and FIG. 2B are intended to be arranged in the manner diagrammatically depicted in FIG. 2A, such that the entire routine 200 may be viewed together. The following discussion assumes that, irrespective of frame rate, the MPEG-like encoding system 100 operates to encode a received video information stream IN according to a predetermined group of pictures (GOP) information structure, where each GOP is allocated a predetermined number of bits (R) such that a constant bitrate output stream OUT is produced by the output buffer 160. That is, a distance N between two I-frames and a distance M between two consecutive reference frames remains the same throughout the encoding process. It is also assumed that a maximum of one mode change occurs between any two consecutive reference frames.

The rate control routine 200 of FIGS. 2A and 2B modifies, in response to the detection of a change in mode (i.e., 24 fps←→30 fps) in the received video information stream IN, a rate control parameter (R) that is used by the TM-5 rate control algorithm to indicate the number of bits remaining in a GOP bit allocation. In this manner, a TM-5 rate control algorithm may be made to function properly in the presence of such a change in mode.

The routine 200 is entered at step 205 when, e.g., the MPEG-like encoding system 100 of FIG. 1 receives a video information stream IN for encoding. The routine 200 then proceeds to step 210, where a variable $R_{SLACK}$ is initialized to zero prior to processing the first GOP of a sequence of GOPS. The variable $R_{SLACK}$ is used to indicate a bit over/under run of the previously encoded GOP. That is, RSLACK indicates that a previous GOP was encoded with fewer bits (under-run) or more bits (over run) than allocated. As such, the presently processed GOP is encoded in a manner tending to correct (though not necessarily correcting) the previous over/under run. The routine 200 then proceeds to step 212.

At step 212 three variables (n20, n30 and $GOP_{BITS}$) are initialized to zero. The first variable n20 is used to indicate the number of frames within a GOP being processed that are encoded during a 24 fps mode of operation. The second variable n30 is used to indicate the number of frames within a GOP being processed that are encoded during a 30 fps mode of operation. The third variable $GOP_{BITS}$ represents the total number of bits used thus far to encode video frames within the GOP being processed. The variables N20 and N30 and $GOP_{BITS}$. This information will be utilized to dynamically update the duration of a GOP during a transition between modes of operation caused by a change in format of the video stream being encoded. The routine 200 then proceeds to step 215.

At step 215 a query is made as to the mode of the received video information stream IN. That is, a query is made as to whether the input video stream IN presently comprises a native 30 fps video stream (e.g., a "standard" NTSC stream) or a native 24 fps video stream (e.g., a 24 fps movie processed according to the 3:2 pull-down process to form a 30 fps stream). An exemplary method for identifying the mode of the received information stream will be described below with respect to FIGS. 3, 4 and 5.

If the query at step 215 indicates that the received video information stream IN comprises 30 fps video material, then the routine 200 proceeds to step 225, where a variable FRAMERATE is initialized to 30. The routine 200 then proceeds to step 230. If the query at step 215 indicates that the received video information stream IN comprises 24 fps video material, then the routine 200 proceeds to step 220, where the variable FRAMERATE is initialized to 24. The routine 200 then proceeds to step 230.

At step 230 the number of bits (R) remaining in a group of pictures (GOP) to be processed is calculated according to equation 1 (below), and the TM-5 reaction parameter (r) is calculated according to equation 2 (below), where:

"R" is the number of bits remaining in the bit allocation for the current GOP;

"$R_{SLACK}$" is the bit over/under run of the previously encoded GOP;

"$N_P$" is the number of P-frames remaining in the present GOP;

"$N_B$" is the number of B-frames remaining in the present GOP;

"BITRATE" is the bitrate of the resulting encoded bitstream;

"FRAMERATE" is 24 or 30 per steps 215–225; and

"r" is a reaction parameter used in a TM-5 rate control algorithm.

$$R = R_{SLACK} + \frac{(1 + N_P + N_B)BITRATE}{FRAMERATE} \quad \text{(equation 1)}$$

$$r = \frac{2 \times BITRATE}{FRAMERATE} \quad \text{(equation 2)}$$

After calculating the number of bits remaining in the bit allocation for the current GOP (R) and the reaction parameter (r), a variable $GOP_{START}$ is set equal to the calculated value of R, and the routine 200 proceeds to step 235, where a query is made as to whether a change in mode has occurred (i.e., 24 fps→30 fps or 30 fps→24 fps). If the query at step 235 indicates that a mode change from 24 fps mode to 30 fps mode has occurred, then the routine 200 proceeds to step 236. If the query at step 235 indicates that a mode change from 30fps mode to 24 fps mode has occurred, then the routine 200 proceeds to step 237. If the query at step 235 indicates that a mode change has not occurred, then the routine 200 proceeds to step 238.

At step 238 the variable R is set equal to $GOP_{START}$—$GOP_{BITS}$. That is, the number of bits remaining in the GOP bit allocation (R) is set equal to the initial bit allocation ($GOP_{START}$) minus the number of bits used ($GOP_{BITS}$). The routine 200 then proceeds to step 260.

At step 260, a quantization parameter(s) is computed for each of the macroblocks forming the presently processed video frame within presently processed GOP. The routine 200 then proceeds to step 265, where the frame is encoded according to, e.g., the TM-5 rate control algorithm. Additionally, the value of variables $N_P$(the number of P-frames remaining in the present GOP) and $N_B$ (the number of B-frames remaining in the present GOP) are adjusted as necessary. The routine 200 then proceeds to step 266, where a query is made as to the present encoding mode, was the frame encoded at step 265 a 24 fps or 30 fps native mode frame?.

If the answer to the query at step 266 indicated that the frame encoded at step 265 was a 30 fps frame, then the routine 200 proceeds to step 267, where the variable n30 is incremented by one. The routine 200 then proceeds to step 270. If the answer to the query at step 266 indicated that the frame encoded at step 265 was a 24 fps frame, then the routine 200 proceeds to step 268, where the variable n20 is incremented by one. The routine 200 then proceeds to step 270.

At step 270, the variable $GOP_{BITS}$ is adjusted. The variable $GOP_{BITS}$ represents the total number of bits used thus far to encode video frames within the GOP being processed. Thus, the value of $GOP_{BITS}$ is increased by the amount of bits (including header information and other bit consuming information) used to process the most recent frame in the GOP being processed. The routine 200 the proceeds to step 275.

At step 275 a query is made as to whether the most recently encoded frame is the last frame of the GOP being processed (i.e., the end of GOP frame). If the query at step 275 is answered negatively, the routine 200 proceeds to step 215.

If the query at step 275 is answered negatively, the routine 200 proceeds to step 280, where a variable RSLACK is set equal to R. Since R represents the number of bits remaining in the bit allocation for the GOP being processed, and since the GOP is now processed, any non-zero value for R represents an under-utilization (R>0) or over-utilization (R<0) of the allocated bit budget. This over/under flow of bit allocation is added to any over/under flow remaining from previously encoded GOPs such that the available bandwidth may be maximally utilized during the encoding process. For example, an underutilized bit budget may be used by encoding the I-frame of the next GOP with an increased number of bits, reducing the quantizer step sizes in subsequent quantized video frames and by other known methods for qualitatively enhancing the encoding process. The routine 200 then proceeds to step 212.

At either of steps 236 and 237, the value of three variables is computed. Specifically, a first variable nBu is equated to a value indicative of the number of B-frames that remain to be coded in the new mode of operation (i.e., the mode entered after detection of a mode change); a second variable nPu is equated to a value indicative of the number of P-frames that remain to be coded in the new mode of operation; and a third variable nBo is equated to a value indicative of the number of B-frames that remain to be coded in the old mode of operation (i.e., the mode prior to the detection of a mode change). After performing step 236, the routine 200 proceeds to step 240. After performing step 237, the routine 200 proceeds to step 250.

At step 240 the number of bits (R) remaining in the GOP currently being processed is calculated according to equation 3 (below), while at step 250 the number of bits (R) remaining in the GOP currently being processed is calculated according to equation 4 (below), where:

"n20" is the number of frames within the present GOP that were encoded during the 24 fps mode of operation;

"n30" is the number of frames within the present GOP that were encoded during the 30 fps mode of operation;

"nBu" is the number of B-frames that remain to be coded in the new mode (i.e., after detection of a mode change);

"nPu" is the number of P-frames that remain to be coded in the new mode; and

"nBo" is the number of B-frames that remain to be coded in the old mode.

$$R = BITRATE \times \frac{n30 + nPu + nBu}{30} + \quad \text{(equation 3)}$$

$$\frac{n20}{20} + \frac{nBo}{24} + R_{SLACK} - GOP_{BITS}$$

$$R = BITRATE \times \frac{n30 + nBo}{30} + \quad \text{(equation 4)}$$

$$\frac{n20}{20} + \frac{nPu + nBu}{24} + R_{SLACK} - GOP_{BITS}$$

After calculating the number of bits (R) remaining in the GOP currently being processed in step 240, the routine 200 proceeds to step 245, where the reaction parameter (r) is calculated according to equation 5 (below). The routine then proceeds to step 260.

$$r = \frac{2 \times BITRATE}{30} \quad \text{(equation 5)}$$

After calculating the number of bits (R) remaining in the GOP currently being processed in step 250, the routine 200 proceeds to step 255, where the reaction parameter (r) is calculated according to equation 6 (below). The routine then proceeds to step 260.

$$r = \frac{2 \times BITRATE}{24} \quad \text{(equation 6)}$$

Figure 3:
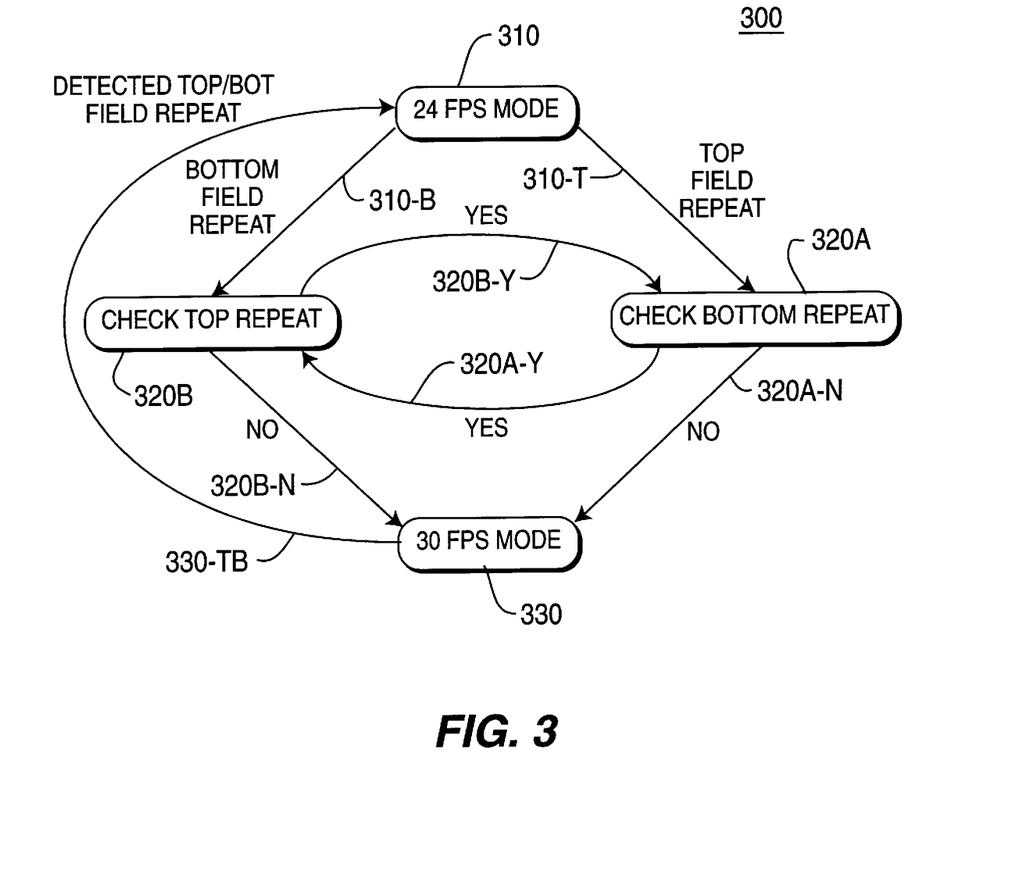
FIG. 3 depicts a state diagram illustrating the different states traversed by an exemplary 3:2 pull-down detection method utilizing a field differencing methodology.

FIG. 3 depicts a state diagram illustrating the different states traversed by an exemplary 3:2 pull-down detection method utilizing a field differencing methodology. Specifically, FIG. 3 depicts a state diagram 300 illustrating the different states traversed by 3:2 pull-down detector 142 or an equivalent 3:2 pull-down detection routine utilizing a field differencing methodology, such as described below with respect to FIG. 4. The state diagram 300 depicts the states traversed when processing an input video sequence (such as input video information stream IN of FIG. 1) including mixed mode video information, i.e., 24 fps mode (movie mode) and 30 fps mode (NTSC mode) information.

Specifically, the state diagram of FIG. 3 depicts a 24 fps state (i.e., a 24 fps mode or movie mode) 310, a 30 fps state (i.e., a 30 fps mode or NTSC mode) 330, and two ambiguous states 320A and 320B. The ambiguous states are those states where, a mode cannot be determined. This occurs on transitions from, e.g., one movie mode to another movie mode or from a movie mode to an NTSC mode.

While in the 30 fps state, the top and bottom fields of the frames being processed are monitored to determine if a top field or a bottom field of a frame is repeated by the next frame. Upon detecting a repeated top field or bottom field, a transition (330-TB) to the 24 fps state is made.

While in the 24 fps state, if a determination is made that a top has been repeated, then a transition (310-T) to the first ambiguous state 320A is made. Similarly, if a determination is made that a bottom field has been repeated, then a transition (310-B) to the second ambiguous state 320B is made.

Upon transitioning to the first ambiguous state 320A, a determination is made as to whether a bottom field has been repeated. If a determination is made that a bottom field has not been repeated, then a transition (320A-N) to the 30 fps state is made. If a determination is made that a bottom field has been repeated, then a transition (320A-Y) to the second ambiguous state 320B is made.

Upon transitioning to the second ambiguous state 320B, a determination is made as to whether a top field has been repeated. If a determination is made that a top field has not been repeated, then a transition (320B-N) to the 30 fps state is made. If a determination is made that a top field has been repeated, then a transition (320B-Y) to the first ambiguous state 320A is made.

In the 30 fps state, each field of each frame is encoded by, e.g., the MPEG-like encoder 100 of FIG. 1 By contrast, in the 24 fps state, only those fields that are not repeated (e.g., due to the 3:2 pull-up processing) are encoded. In the ambiguous state the received video frames are encoded as interlaced fields. However, to avoid encoding an odd number of fields (e.g., transitioning to the 30 fps state after dropping a field while in the 24 fps state), the state diagram ensures that the second ambiguous state 320B (when entered from the 24 fps state) continues beyond the odd field by checking for bottom repeat in the next frame (i.e., path 320B-Y). Similarly, the state diagram ensures that the first ambiguous state 320A (when entered from the 24 fps state) continues beyond the odd field by checking for top repeat in the next frame (i.e., path 320A-Y).

Figure 4:
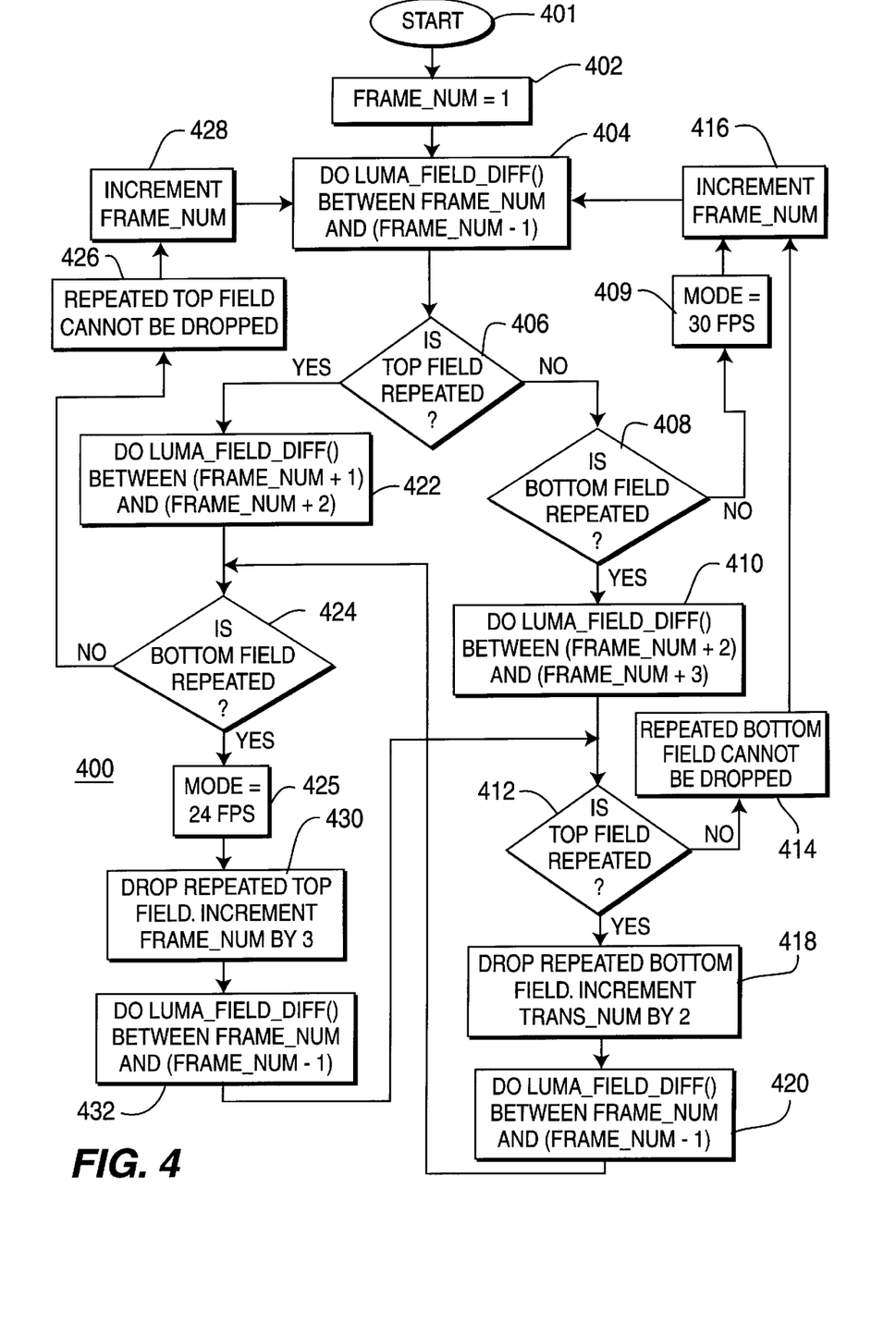
FIG. 4 depicts a flow diagram of 3:2 pull-down detection routine according to the invention and suitable for use in the MPEG-like encoding system of FIG. 1.

FIG. 4 depicts a flow diagram of 3:2 pull-down detection routine according to the invention and suitable for use in either the 3:2 pull-down detector 142 or the rate controller 140 of the MPEG-like encoding system of FIG. 1. Specifically, the 3:2 pull-down detection routine implements the state diagram 300 of FIG. 3. The 3:2 pull-down detection routine 400 of FIG. 4. determines whether a sequence of image frames, illustratively, a sequence of image frames received via input video information stream IN of the MPEG-like system of FIG. 1, comprises native 30 fps video material or native 24 fps video material (e.g., video processed according to the above-described 3:2 pull-down process).

The routine 400 is entered at step 401, when, e.g., video information stream IN is received by the 3:2 pull-down detector 142 or the rate controller 140 of the system 100 of FIG. 1. The routine 400 then proceeds to step 402, where an index variable FRAME_NUM is initialized to one. The routine 400 then proceeds to step 404.

At step 404 a comparison is made between the luminance information of the current video frame (as indexed by the FRAME_NUM variable) and luminance information of the prior video frame (as indexed by the FRAME_NUM variable decremented by one). That is, the luminance information within the top field and bottom field of the FRAME_NUM frame is compared with respective luminance information within the top field and bottom field of the FRAME_NUM- 1 frame to determine if either of the top or bottom fields has been repeated. The routine 400 then proceeds to step 406.

At step 406 a query is made as to whether the top field has been repeated. If the query at step 406 is answered negatively, then the routine 400 proceeds to step 408. If the query at step 406 is answered affirmatively, then the routine 400 proceeds to step 422.

At step 408, a query is made as to whether the bottom field has been repeated. If the query at step 408 is answered negatively, then the routine 400 proceeds to step 409 where a variable MODE is set to indicate that the input video information stream IN is in the 30 fps mode. The routine 400 then proceeds to step 416, where the index variable FRAME_NUM is incremented, and to step 404.

If the query at step 408 is answered affirmatively, then the routine 400 proceeds to step 410, where a comparison is made between the luminance information of the video frame following the next video frame to be processed (i.e., FRAME_NUM+2) and luminance information of the frame following that (i.e., FRAME_NUM+3). The purpose of comparing these frames is to determine if an odd number of fields would be encoded by dropping the bottom field of the current frame (i.e., FRAME_NUM). The routine 400 then proceeds to step 412.

At step 412 a query is made as to whether the top field of the FRAME_NUM+2 frame is repeated by the FRAME_NUM plus 3 frame. If the query at step 412 is answered negatively, then the routine 400 proceeds to step 414.

At step 414 it is noted that the repeated bottom field cannot be dropped. This is because the repeated bottom field is associated with a non-repeated top field, and therefore, the repeated bottom field would comprise an odd field for encoding. That is, if the query at step 412 indicates that the top field has not been repeated, this is because of a transition between 24 fps mode and 30 fps mode and the bottom field, if dropped (i.e., not encoded) would result in an odd field being encoded. The routine 400 then proceeds to step 416, where the variable FRAME_NUM is incremented, and proceeds to step 404.

If the query at step 412 is answered affirmatively, then the routine 400 proceeds to step 418, where the bottom field of the present frame (i.e., FRAME_NUM) is dropped (i.e., not encoded) and the index variable FRAME_NUM is incremented by two. The routine 400 then proceeds to step 420.

At step 420, a comparison is made between the luminance information of the current video frame (as indexed by the FRAME_NUM variable) and luminance information of the prior video frame (as indexed by the FRAME_NUM variable decremented by one). The routine 400 then proceeds to step 424.

If the query at step 406 is answered affirmatively, then the routine 400 proceeds to step 422, where a comparison is made between the luminance information of the next video frame to be processed (i.e., FRAME_NUM+1) and luminance information of the frame following that (i.e., FRAME_NUM+2). The purpose of comparing these frames is to determine if an odd number of fields would be encoded by dropping the top field of the current frame (i.e., FRAME_NUM). The routine 400 then proceeds to step 424.

At step 424, a query is made as to whether the bottom field has been repeated. If the query at step 424 is answered negatively, then the routine 400 proceeds to step 426. If the query at step 424 is answered affirmatively, then the routine 400 proceeds to step 425.

At step 426, it is noted that the repeated top field cannot be dropped. This is because the repeated top field is associated with a non-repeated bottom field, and therefore, the repeated top field would comprise an odd field for encoding. The routine 400 then proceeds to step 428, where the variable FRAME_NUM is incremented. The routine 400 then proceeds to step 404.

At step 425, a mode indicator is set equal to 24 fps, indicating that the input video stream comprises native 24 frames per second video that has been processed according to a 3:2 pulled-up process to produce 30 fps video material. The routine 400 then proceeds to step 430, where the repeated top field is dropped, and the index variable FRAME_NUM is incremented by three. The routine 400 then proceeds to step 432, where a comparison is made between the luminance information of the current video frame (as indexed by the FRAME_NUM variable) and luminance information of the prior video frame (as indexed by the FRAME_NUM variable decremented by one). The routine 400 then proceeds to step 412.

Figure 5:
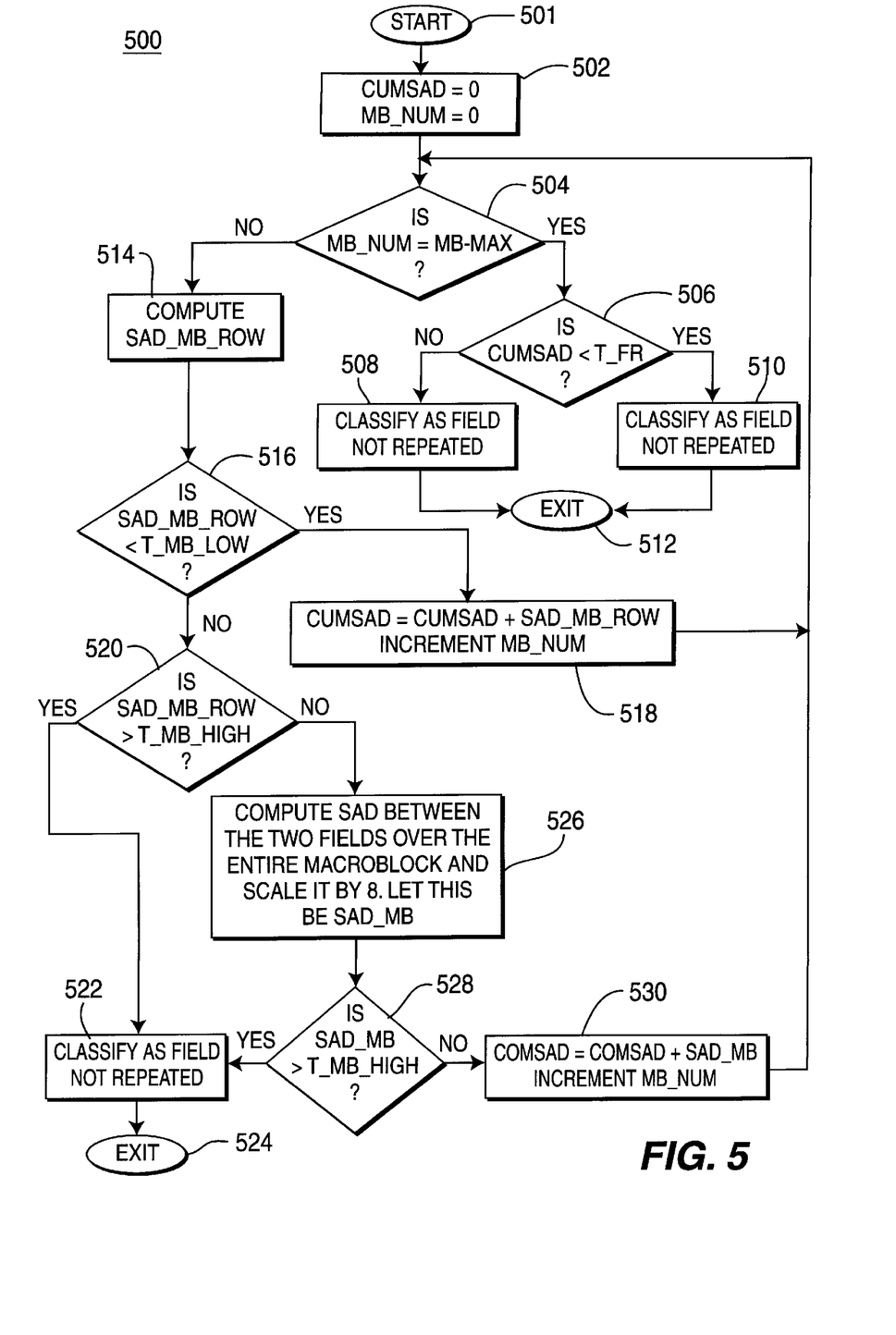
FIG. 5 depicts a flow diagram of a field differencing routine according to the invention and suitable for use in the MPEG-like encoding system of FIG. 1 and the 3:2 pull-down detection routine of FIG. 4.

FIG. 5 depicts a flow diagram of a field differencing routine according to the invention and suitable for use in the MPEG-like encoding system of FIG. 1 and the 3:2 pull-down detection routine of FIG. 4. Specifically, FIG. 5 depicts a flow diagram 500 of a field differencing (i.e., comparison routine) 500 suitable for implementing, e.g., steps 404, 410, 420, 422 and 432 in the 3:2 pull-down detection routine 400 of FIG. 4.

The routine 500 is entered in step 501 and proceeds to step 402, where a variable MB_NUM is initialized to 0. The routine 500 then proceeds to step 504, where a query is made as to whether MB_NUM is equal to MB_MAX. It must be noted that MB_NUM indicates the number of the macroblock presently being operated upon, while MB_MAX comprises the number of the last macroblock of a frame to be operated upon. MB_MAX will vary depending upon the format of the video being processed.

If the query in step 504 is answered negatively, then the routine 400 proceeds to step 5014 where the sum of absolute differences between two consecutive fields of the same parity accumulated over one row of pixels within a 16×16 macroblock, where the frame is divided into non-overlapping 16×16 macroblocks. After computing the SAD_MB_ROW, the routine 500 proceeds to step 516, where a query is made as to whether SAD_MB_ROW is less than T_MB_LOW. T_MB_LOW represents as threshold level of 144 in the preferred embodiment.

If the query in step 516 is answered affirmatively, then the routine 500 proceeds to step 518, where the variable CUM-SAD is incremented by the variable SAD_MB_ROW, and the variable MB_NUM is incremented by 1. The routine 500 then proceeds to step 504.

If the query in step 516 is answered negatively, then the routine 500 proceeds to step 520, where a query is made as to whether SAD_MB_ROW is greater than the variable T_MB_HIGH. T_MB_HIGH is a threshold level of 512 in the exemplary embodiments. If the query at step 520 is answered affirmatively, then the routine proceeds to step 522, where the field including the presently examined macroblock is classified as a non-repeated field. The routine 500 then proceeds to step 524, where it is exited.

If the query in step 520 is answered negatively, then the routine 500 proceeds to step 526, where the sum of absolute differences between the two fields over the entire macroblock is computed, scaled by 8, and stored as the variable SAD_MB. The routine 500 then proceeds to step 528, where a query is made as to whether SAD_MB is greater than T_MB_HIGH. If the query in step 528 is answered affirmatively, then the routine proceeds to step 522. If the query in step 528 is answered negatively, then the routine proceeds to step 530, where the variable CUM-SAD is incremented by SAD_MB, and the variable MB_NUM is incremented by 1. The routine 500 then proceeds to step 504.

If the query in step 504 is answered affirmatively, the routine 500 proceeds to step 506, where a query is In the exemplary embodiment, T_FR is a threshold value equivalent to 2.5 the width of the macroblock multiplied by the height of the macroblock. If the query in step 506 is answered negatively, then the routine 500 proceeds to step 508 where the presently examined field is classified as a non-repeated field. If the query at step 506 is affirmatively, then the routine 500 proceeds to step 510, where the presently examined field is classified as a repeated field. The routine 500 proceeds from either of steps 508 or 510 to step 512, where the routine 500 is exited.

To hasten field differencing computations and to reduce memory bandwidth, the 3:2 pull-down detector (referred to as a luma repeat field detector) compares two fields according to the following method: First, the sum of absolute difference (SAD) within, e.g., consecutive luminance fields of the same parity along one row in each macroblock (e.g., one macroblock=8 rows×16 pixels.) is computed. Second, if the computed sum of absolute difference (SAD) is greater than an upper threshold level T_MB_HIGH, then the second field is not a repeat of the first field and the method terminates. Third, if the computed SAD is less than the upper threshold level T_MB_HIGH, then proceed to the next macroblock in the field and repeat steps one to three. Fourth, if the computed SAD less than or equal to the upper threshold level T_MB_HIGH and greater than or equal to a lower threshold level T_MB_LOW, then compute SAD over the entire macroblock. Fifth, the SAD is greater than a threshold over a macroblock T_MB, then the second field is not a repeat of the first field. Otherwise, proceed to the next macroblock and repeat the above steps. Finally, if all the macroblocks are processed and the total SAD does not exceed a threshold over a frame T_FR, then the second field is a repeat of the first field.

Such multi-tier thresholding reduces the probability of false alarms. Also, the thresholds allow us to account for transcoding errors which might prevent the fields from being exact repeats. The thresholds can be arrived at empirically based on a large set of 3:2 pulled-down material.

Experiments conducted by the inventors indicate that utilization of the present invention to remove pull-down processing from a video stream to be encoded results in a quantitative improvement of at 0.9–1.5 dB for luminance information and 0.5–1.2 dB for the chrominance information. Additionally, for mixed mode sequences, where the standard TM-5 rate control algorithms tend to break down, the rate control performs well and improves the quality of frames in the 24 fps (i.e., movie mode) by a similar amount.

In one embodiment of the invention, syntax within the MPEG standards are used to help identify repeated fields. Specifically, the top_field$_{13}$ first flag and repeat_first_field flags may be used to determine which fields are repeated, as indicated below by Table 1.

| top_field_first | repeat_first_field | Result |
| --- | --- | --- |
| 1 | 1 | Repeated top field |
| 0 | 0 | No repeated field |
| 0 | 1 | Repeated bottom field |
| 1 | 0 | No repeated field |

Thus, in the case of encoding (or transcoding) a received information stream including the above-described top_field_first flag and repeat_first_field flags, redundant information (i.e., repeated fields) may be dropped prior to encoding.

The present invention can be embodied in the form of computer-implemented processes and apparatuses for practicing those processes. The present invention also can be embodied in the form of computer program code embodied in tangible media, such as floppy diskettes, CD-ROMs, hard drives, or any other computer readable storage medium, wherein, when the computer program code is loaded into and executed by a computer, the computer becomes an apparatus for practicing the invention. The present invention can also be embodied in the form of computer program code, for example whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Although various embodiments which incorporate the teachings of the present invention have been shown and described in detail herein, those skilled in the art can readily devise many other varied embodiments that still incorporate these teachings.

What is claimed is:

1. A method for encoding a sequence of images according to a group of pictures (GOP) information structure to produce a sequence of compressed images, said method comprising the steps of:

determining if a frame rate of one or more images of said sequence of images, including said image frame being processed, has been modified according to a 3:2 pull-down process;

adapting, in response to said determination, a GOP bit allocation parameter, said bit allocation parameter being indicative of a number of bits remaining in a bit allocation for a current GOP;

encoding, using said GOP bit allocation parameter and in accordance with said GOP information structure, said image frames being processed;

entering a 24 frames per second (fps) mode of operation by dropping repeated fields from said sequence of images in response to a determination that said sequence of images including said image frames being processed has been subjected to a 3:2 pull-down processing; and entering a 30 frames per second (fps) mode of operation in response to a determination that said sequence of images including said image frame being processed has not been subjected to a 3:2 pull-down processing, wherein:

for a first image frame processed after said system exits said 24 fps mode and enters said 30 fps mode, said GOP bit allocation parameter (R) is calculated according to the equation:

$$R = BITRATE \leftrightarrow \frac{n30 + nPu + nBu}{30} + \frac{n20}{20} + \frac{nBo}{24} + R_{SLACK} - GOP_{BITS};$$

where:

$R_{SLACK}$ is a bit utilization overrun or underrun of the previously encoded GOP;

"BITRATE" is the bitrate of a resulting encoded bitstream including said sequence of compressed images;

$GOP_{BITS}$ represents the total number of bits used to encode image frames within the current GOP;

n20 is the number of frames within the current GOP that were encoded during said 24 fps mode of operation;

n30 is the number of frames within the current GOP that were encoded during said 30 fps mode of operation;

nBu is the number of B-frames within the current GOP that remain to be coded in said 30 fps mode;

nPu is the number of P-frames that remain to be in said 30 fps mode; and nBo is the number of B-frames that remain to be coded in said 24 fps mode.

2. The method of claim 1, further comprising the step of calculating a reaction parameter (r) according to the equation:

$$r = \frac{2 \times BITRATE}{30}.$$

3. The method of claim 1, wherein said step of determining whether a first field is repeated by a following second field comprises the steps of:
(a) comparing, for a pixel block of said first field and a corresponding pixel block of said second field, a sum of the absolute differences (SAD) between a first row of said corresponding pixel blocks to a first threshold value;
(b) if said first threshold value is exceeded, then comparing said single row SAD to a second threshold level, if said second threshold level is exceeded then said first field is not repeated by said second field; and
(c) comparing, for said pixel block of said first field and said corresponding pixel block of said second field, a sum of the absolute differences (SAD) between all the rows of said corresponding pixel blocks to a third threshold value, if said third threshold value is exceeded, then said first field is not repeated by said second field.

4. The method of claim 1, wherein:
said determination that said sequence of images including said image frames being processed has been subjected to a 3:2 pull-down processing is made with respect to field repeat and field ordering information associated with said sequence of images.

5. A method for encoding a sequence of images according to a group of pictures (GOP) information structure to produce a sequence of compressed images, said method comprising the steps of:
determining if a frame rate of one or more images of said sequence of images, including said image frame being processed, has been modified according to a 3:2 pull-down process;
adapting, in response to said determination, a GOP bit allocation parameter, said bit allocation parameter being indicative of a number of bits remaining in a bit allocation for a current GOP;
encoding, using said GOP bit allocation parameter and in accordance with said GOP information structure, said image frames being processed;
entering a 24 frames per second (fps) mode of operation by dropping repeated fields from said sequence of images in response to a determination that said sequence of images including said image frames being processed has been subjected to a 3:2 pull-down processing; and
entering a 30 frames per second (fps) mode of operation in response to a determination that said sequence of images including said image frame being processed has not been subjected to a 3:2 pull-down processing, wherein
for a first image frame processed after said system exits said 30 fps mode and enters said 24 fps mode, said GOP bit allocation parameter (R) is calculated according to the equation:

$$R = BITRATE \leftrightarrow \frac{n30 + nBo}{30} + \frac{n20}{20} + \frac{nPu + nBu}{24} + R_{SLACK} - GOP_{BITS}$$

where:
$R_{SLACK}$ is a bit utilization overrun or underrun of the previously encoded GOP;
"BITRATE" is the bitrate of a resulting encoded bitstream including said sequence of compressed images;
$GOP_{BITS}$ represents the total number of bits used to encode image frames within the current GOP;
n20 is the number of frames within the current GOP that were encoded during said 24 fps mode of operation;
n30 is the number of frames within the current GOP that were encoded during said 30 fps mode of operation;
nBu is the number of B-frames within the current GOP that remain to be coded in said 30 fps mode;
nPu is the number of P-frames that remain to be in said 30 fps mode; and
nBo is the number of B-frames that remain to be coded in said 24 fps mode.

6. The method of claim 5, further comprising the step of calculating a reaction parameter (r) according to the equation:

$$r = \frac{2 \times BITRATE}{24}.$$

7. The method of claim 5, wherein said step of determining whether a first field is repeated by a following second field comprises the steps of:
(a) comparing, for a pixel block of said first field and a corresponding pixel block of said second field, a sum of the absolute differences (SAD) between a first row of said corresponding pixel blocks to a first threshold value;
(b) if said first threshold value is exceeded, then comparing said single row SAD to a second threshold level, if said second threshold level is exceeded then said first field is not repeated by said second field; and
(c) comparing, for said pixel block of said first field and said corresponding pixel block of said second field, a sum of the absolute differences (SAD) between all the rows of said corresponding pixel blocks to a third threshold value, if said third threshold value is exceeded, then said first field is not repeated by said second field.

8. The method of claim 5, wherein:
said determination that said sequence of images including said image frames being processed has been subjected to a 3:2 pull-down processing is made with respect to field repeat and field ordering information associated with said sequence of images.

9. A method for encoding a sequence of images according to a group of pictures (GOP) information structure to produce a sequence of compressed images, said method comprising the steps of:
determining if a frame rate of one or more images of said sequence of images, including said image frame being processed, has been modified according to a 3:2 pull-down process;
adapting, in response to said determination, a GOP bit allocation parameter, said bit allocation parameter being indicative of a number of bits remaining in a bit allocation for a current GOP;

encoding, using said GOP bit allocation parameter and in accordance with said GOP information structure, said image frames being processed;

entering a 24 frames per second (fps) mode of operation by dropping repeated fields from said sequence of images in response to a determination that said sequence of images including said image frames being processed has been subjected to a 3:2 pull-down processing; and entering a 30 frames per second (fps) mode of operation in response to a determination that said sequence of images including said image frame being processed has not been subjected to a 3:2 pull-down processing, wherein:

said system exits said 30 fps mode and enters said 24 fps mode when a determination is made that a top field and a bottom field of a field mode image frame have been repeated;

said system exits said 24 fps mode end enters a first ambiguous mode when a determination is made that a top field has been repeated; said system exits said first ambiguous mode and enters said 30 fps mode when a determination is made that a bottom field has not been repeated;

said system exits said 24 fps mode end enters a second ambiguous mode when a determination is made that a bottom field has been repeated; said system exits said second ambiguous mode and enters said 30 fps mode when a determination is made that a top field has not been repeated;

said system exits said first ambiguous mode and enters said second ambiguous mode when a determination is made that a bottom field has been repeated; and said system exits said second ambiguous mode and enters said first ambiguous mode when a determination is made that a top field has been repeated.

10. The method of claim 9, wherein said step of determining whether a first field is repeated by a following second field comprises the steps of:

(a) comparing, for a pixel block of said first field and a corresponding pixel block of said second field, a sum of the absolute differences (SAD) between a first row of said corresponding pixel blocks to a first threshold value;

(b) if said first threshold value is exceeded, then comparing said single row SAD to a second threshold level, if said second threshold level is exceeded then said first field is not repeated by said second field; and (c) comparing, for said pixel block of said first field and said corresponding pixel block of said second field, a sum of the absolute differences (SAD) between all the rows of said corresponding pixel blocks to a third threshold value, if said third threshold value is exceeded, then said first field is not repeated by said second field.

11. The method of claim 10, wherein if said third threshold value is not exceeded, said method further comprises the step of:

accumulating said all row SAD and repeating steps (a) through (c) for a next corresponding pair of pixel blocks.

12. The method of claim 11, wherein if said first threshold value is not exceeded, said method further comprises the step of:

accumulating said single row SAD and repeating steps (a) through (c) for a next corresponding pair of pixel blocks.

13. The method of claim 12, wherein if all of said corresponding pixel blocks in said first and second fields have been processed, said method further comprises the step of:

comparing said accumulated SAD information to a fourth threshold level, if said fourth threshold value is not exceeded, then said first field is not repeated by said second field, else first field is repeated by said second field.

14. The method of claim 9, wherein:

said determination that said sequence of images including said image frames being processed has been subjected to a 3:2 pull-down processing is made with respect to field repeat and field ordering information associated with said sequence of images.

15. The method of claim 14, wherein said field repeat and field ordering information comprises respective repeat__first__field and top__field__first syntax within an MPEG-like information stream including said sequence of images.

16. Apparatus, comprising:

a rate controller, for controlling a quantizer;

said rate controller determining if a frame rate of one or more images of a sequence of images, including an image frame being processed, has been modified according to a 3:2 pull-down process;

said rate controller adapting, in response to said determination, a GOP bit allocation parameter, said bit allocation parameter being indicative of a number of bits remaining in a bit allocation for a current GOP; and said rate controller adapting a quantization step size of said image frame being processed in response to said GOP bit allocation parameter and in accordance with a GOP information;

said frame rate modification process comprises a 3:2 pull-down process;

said rate controller enters a 24 frames per second (fps) mode of operation in response to a determination that said sequence of images including said image frame being processed has been subjected to a 3:2 pull-down processing; and said rate controller enters a 30 frames per second (fps) mode of operation in response to a determination that said sequence of images including said image frame being processed has not been subjected to a 3:2 pull-down processing; wherein:

said rate controller exits said 30 fps mode and enters said 24 fps mode when a determination is made that a top field and a bottom field of a field mode image frame have been repeated;

said rate controller exits said 24 fps mode end enters a first ambiguous mode when a determination is made that a top field has been repeated; said system exits said first ambiguous mode and enters said 30 fps mode when a determination is made that a bottom field has not been repeated;

said rate controller exits said 24 fps mode end enters a second ambiguous mode when a determination is made that a bottom field has been repeated; said system exits said second ambiguous mode and enters said 30 fps mode when a determination is made that a top field has not been repeated;

said rate controller exits said first ambiguous mode and enters said second ambiguous mode when a determination is made that a bottom field has been repeated; and said system exits said second ambiguous mode and enters said first ambiguous mode when a determination is made that a top field has been repeated.

17. A method for determining whether a first field is repeated by a following second field, comprising the steps of:
   (a) comparing, for a pixel block of said first field and a corresponding pixel block of said second field, a sum of the absolute differences (SAD) between a first row of said corresponding pixel blocks to a first threshold value;
   (b) if said first threshold value is exceeded, then comparing said single row SAD to a second threshold level, if said second threshold level is exceeded then said first field is not repeated by said second field; and
   (c) comparing, for said pixel block of said first field and said corresponding pixel block of said second field, a sum of the absolute differences (SAD) between all the rows of said corresponding pixel blocks to a third threshold value, if said third threshold value is exceeded, then said first field is not repeated by said second field.

18. The method of claim 17, wherein if said third threshold value is not exceeded, said method further comprises the step of:
   accumulating said all row SAD and repeating steps (a) through (c) for a next corresponding pair of pixel blocks.

19. The method of claim 18, wherein if said first threshold value is not exceeded, said method further comprises the step of:
   accumulating said single row SAD and repeating steps (a) through (c) for a next corresponding pair of pixel blocks.

20. The method of claim 19, wherein if all of said corresponding pixel blocks in said first and second fields have been processed, said method further comprises the step of:
   comparing said accumulated SAD information to a fourth threshold level, if said fourth threshold value is not exceeded, then said first field is not repeated by said second field, else first field is repeated by said second field.

* * * * *

UNITED STATES PATENT AND TRADEMARK OFFICE
CERTIFICATE OF CORRECTION

PATENT NO.    : 6,167,088
DATED         : September 11, 1998
INVENTOR(S)   : Sriram Sethuraman It is certified that error appears in the above-identified patent and that said Letters Patent is hereby corrected as shown below:

Column 17,
Line 8, insert -- determining comprises -- after "step of";
Line 10, change "comprises" to -- comprising --.

Column 18,
Line 32, insert -- determining comprises -- after "step of";
Line 34, change "comprises" to -- comprising --.

Column 19,
Line 39, insert -- determining comprises -- after "step of";
Line 41, change "comprises" to -- comprising --.

Column 20,
Lines 54 and 60, change "end" to -- and --.

Signed and Sealed this

Sixteenth Day of May, 2006

JON W. DUDAS
*Director of the United States Patent and Trademark Office*

UNITED STATES PATENT AND TRADEMARK OFFICE
CERTIFICATE OF CORRECTION

| | |
|---|---|
| PATENT NO. | : 6,167,088 |
| APPLICATION NO. | : 09/151425 |
| DATED | : December 26, 2000 |
| INVENTOR(S) | : Sriram Sethuraman |

It is certified that error appears in the above-identified patent and that said Letters Patent is hereby corrected as shown below:

<u>Column 17,</u>
Line 8, insert -- determining comprises -- after "step of";
Line 10, change "comprises" to -- comprising --.

<u>Column 18,</u>
Line 32, insert -- determining comprises -- after "step of";
Line 34, change "comprises" to -- comprising --.

<u>Column 19,</u>
Line 39, insert -- determining comprises -- after "step of";
Line 41, change "comprises" to -- comprising --.

<u>Column 20,</u>
Lines 54 and 60, change "end" to -- and --.

This certificate supersedes Certificate of Correction issued May 16, 2006.

Signed and Sealed this

Eighth Day of August, 2006

JON W. DUDAS
*Director of the United States Patent and Trademark Office*